US011474855B2

(12) United States Patent
Kogure et al.

(10) Patent No.: US 11,474,855 B2
(45) Date of Patent: Oct. 18, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Takeshi Kogure, Toride (JP); Atsushi Ikeda, Toride (JP); Hiroaki Koike, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 16/512,071

(22) Filed: Jul. 15, 2019

(65) Prior Publication Data
US 2020/0026554 A1 Jan. 23, 2020

(30) Foreign Application Priority Data

Jul. 23, 2018 (JP) .............................. JP2018-137629

(51) Int. Cl.
*G06F 9/455* (2018.01)
*G06F 9/48* (2006.01)
*G06F 16/11* (2019.01)

(52) U.S. Cl.
CPC ........ *G06F 9/4843* (2013.01); *G06F 9/45558* (2013.01); *G06F 16/113* (2019.01); *G06F 2009/45579* (2013.01)

(58) Field of Classification Search
CPC .................................................. G06F 9/4843
USPC .......................................................... 718/1
See application file for complete search history.

(56) References Cited

U.S. PATENT DOCUMENTS

| 9,680,894 | B2* | 6/2017 | Lyons | G06T 1/60 |
| 2004/0143739 | A1* | 7/2004 | de Jong | G06F 21/64 |
| | | | | 713/176 |
| 2004/0186859 | A1* | 9/2004 | Butcher | G06F 16/10 |
| 2006/0156010 | A1* | 7/2006 | Kim | G11B 20/0021 |
| | | | | 713/176 |
| 2006/0206728 | A1* | 9/2006 | Masuda | H04L 9/321 |
| | | | | 713/193 |
| 2007/0005504 | A1* | 1/2007 | Chen | G06Q 30/06 |
| | | | | 705/59 |
| 2007/0094508 | A1* | 4/2007 | Pal | G06F 21/572 |
| | | | | 713/176 |
| 2007/0260701 | A1* | 11/2007 | Thomason | G06F 16/9574 |
| | | | | 709/217 |
| 2007/0294391 | A1* | 12/2007 | Kohn | H04L 63/145 |
| | | | | 709/224 |
| 2008/0170696 | A1* | 7/2008 | Yoshimura | G06F 21/57 |
| | | | | 380/277 |

(Continued)

FOREIGN PATENT DOCUMENTS

JP 10-333902 A 12/1998
JP 2005-293109 A 10/2005

(Continued)

*Primary Examiner* — Mehran Kamran
(74) *Attorney, Agent, or Firm* — Canon U.S.A., Inc. IP Division

(57) ABSTRACT

An information processing apparatus switches alteration detection processing depending on timing of execution of alteration detection to perform alteration detection processing for each file to be accessed to detect an alteration in an extended application, and switches alteration detection execution determination processing depending on a type of access to an extended application package.

10 Claims, 18 Drawing Sheets

(56) References Cited

U.S. PATENT DOCUMENTS

| | | | | |
|---|---|---|---|---|
| 2010/0169948 A1* | 7/2010 | Budko | | H04L 9/088 726/1 |
| 2011/0016091 A1* | 1/2011 | Prahlad | | G06F 16/1748 707/654 |
| 2011/0311046 A1* | 12/2011 | Oka | | H04N 1/00222 380/243 |
| 2013/0132951 A1* | 5/2013 | Shah | | G06F 9/45558 718/1 |
| 2013/0198459 A1* | 8/2013 | Joshi | | G06F 12/0891 711/130 |
| 2013/0276068 A1* | 10/2013 | Alwar | | G06F 9/5077 726/4 |
| 2014/0026121 A1* | 1/2014 | Jackson | | G06F 9/44589 717/124 |
| 2014/0068324 A1* | 3/2014 | Cudak | | G06F 11/1435 714/6.22 |
| 2014/0250215 A1* | 9/2014 | Bowen | | G06F 21/57 709/223 |
| 2015/0095653 A1* | 4/2015 | Shim | | G06F 21/51 713/181 |
| 2015/0163229 A1* | 6/2015 | Lindteigen | | H04L 63/1441 713/155 |
| 2015/0205949 A1* | 7/2015 | Iskin | | G06F 21/51 713/187 |
| 2015/0379020 A1* | 12/2015 | Steiner | | G06F 16/16 707/668 |
| 2016/0253170 A1* | 9/2016 | Fardig | | G06F 8/658 717/170 |
| 2016/0314315 A1* | 10/2016 | Krogius | | G06F 21/6263 |
| 2017/0033930 A1* | 2/2017 | Costa | | G06F 21/62 |
| 2017/0111166 A1* | 4/2017 | Zheng | | G06F 8/658 |
| 2017/0230414 A1* | 8/2017 | Kamble | | H04L 63/123 |
| 2017/0237567 A1* | 8/2017 | Ahn | | G06F 21/54 713/165 |
| 2017/0249252 A1* | 8/2017 | Elias | | G06F 12/023 |
| 2017/0351535 A1* | 12/2017 | Mao | | G06F 9/45533 |
| 2018/0102902 A1* | 4/2018 | Yang | | G06F 21/602 |
| 2018/0253545 A1* | 9/2018 | Huang | | G06F 21/64 |
| 2018/0268159 A1* | 9/2018 | Yu | | H04L 9/14 |
| 2019/0007434 A1* | 1/2019 | McLane | | G06N 3/084 |
| 2020/0412829 A1* | 12/2020 | Huang | | G06F 12/084 |

FOREIGN PATENT DOCUMENTS

| | | |
|---|---|---|
| JP | 2009-258772 A | 11/2009 |
| JP | 2016-095792 A | 5/2016 |

\* cited by examiner

FIG.14

| OFFSET | DATA | |
|---|---|---|
| 0x00000000 | xxxxxxxxx....xxxxxx | 1400 |
| 0x00010000 | xxxxxxxxx....xxxxxx | |
| 0x00020000 | xxxxxxxxx....xxxxxx | |
| 0x00030000 | xxxxxxxxx....xxxxxx | |
| : : : | | |
| 0x00060000 | xxxxxxxxx....xxxxxx | |
| 0xffffffff | xxxxxxxxx....xxxxxx | |

FIG.16

| OFFSET | SIZE | ALTERNATION ALREADY CHECKED | FILE PATH |
|---|---|---|---|
| 0x00000000 | 0x1100 | ALREADY CHECKED | main SCRIPT |
| 0x00010000 | 0x1200 | ALREADY CHECKED | Sub1 SCRIPT |
| 0x00020000 | 0x1300 | ALREADY CHECKED | Sub2 SCRIPT |
| 0x00030000 | 0x1400 | ALREADY CHECKED | Sub3 SCRIPT |
| ⋮ | ⋮ | ⋮ | |
| 0x00060000 | 0x1500 | ALREADY CHECKED | resource1 |
| 0x00070000 | 0x1600 | NOT YET | resource2 |

FIG.18

| APPLICATION ID | PRESENCE OR ABSENCE OF ALTERATION |
|---|---|
| 0 | ABSENCE |
| 1 | ABSENCE |
| 2 | ABSENCE |
| 3 | ABSENCE |
| ⋮ | ⋮ |
| 6 | ABSENCE |
| 7 | ABSENCE |

~1800

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

Japanese Patent Application Laid-Open No. 10-333902 discusses a method for inspecting a digest of a file configuring a program as a method for detecting an alteration in a program. A method for enhancing security is also discussed. In the method, an alteration is checked not only at the time of activation of a device, but also any time during execution of a program (i.e., a runtime alteration check), so that security is further enhanced.

In the method of Japanese Patent Application Laid-Open No. 10-333902, however, digests of all of files configuring the program need to be inspected when an alteration in the program is detected. Even a digest of data that is not necessary for execution of the program is inspected. Consequently, alteration detection processing takes time, which affects performance of a system as a whole.

SUMMARY OF THE INVENTION

According to an aspect of the present invention, an information processing apparatus includes a unit configured to separately load a plurality of files archived in a package file to execute an extended application, a calculation unit configured to calculate individual digest information about a file that is in the archive and to be loaded by the unit, a comparison unit configured to compare the individual digest information about the file calculated by the calculation unit with individual digest information about a file stored beforehand in a storage unit, and a notification unit configured to provide a message based on a result of the comparison made by the comparison unit.

Further features of the present invention will become apparent from the following description of exemplary embodiments with reference to the attached drawings.

BRIEF DESCRIPTION OF THE DRAWINGS

FIG. 14 is a block diagram illustrating a configuration of a buffer memory according to the present exemplary embodiment.

FIG. 16 is a configuration diagram illustrating a state of a file inside a package according to the present exemplary embodiment.

FIG. 18 is a block diagram illustrating a configuration of information about an alteration state of the extended application according to the present exemplary embodiment.

DESCRIPTION OF THE EMBODIMENTS

Hereinafter, an exemplary embodiment is described in detail with reference to the drawings. The following exemplary embodiment is not intended to limit the scope of the claims of the present invention, and not all of the combinations of the aspects that are described in the following embodiment are necessarily required with respect to an issue to be solved by the present invention.

Figure 1:
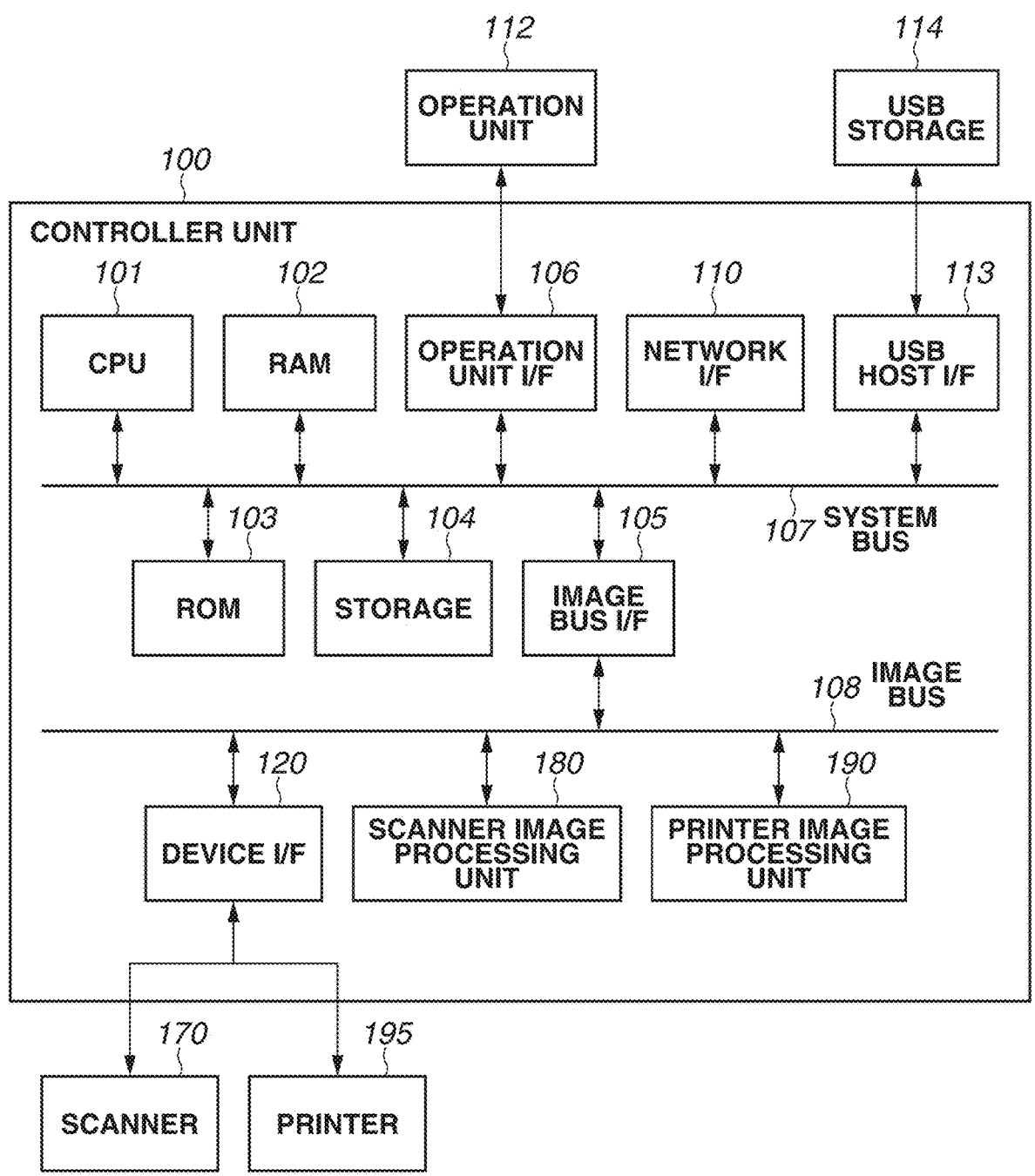
FIG. 1 is a block diagram illustrating a hardware configuration of an information processing apparatus according to the present exemplary embodiment.

FIG. 1 is a block diagram illustrating a configuration example of main components of an information processing apparatus (e.g., an image forming apparatus 301 described below). The information processing apparatus includes a controller unit 100, which is connected to a scanner 170 as an image input device and a printer 195 as an image output device. The controller unit 100 is also connected to an operation unit 112. The controller unit 100 performs control to provide a copy function by which the printer 195 prints out an image based on image data read by the scanner 170.

The controller unit 100 includes a central processing unit (CPU) 101. The CPU 101 starts an operating system (OS) based on a boot program stored in a read only memory (ROM) 103. The CPU 101 executes, on the OS, a program stored in a storage 104, thereby executing various processing. A random access memory (RAM) 102 is used as a work area of the CPU 101. The RAM 102 provides not only the work area, but also an image memory area in which image data is temporarily stored. The storage 104 stores a program and image data.

The CPU 101 is connected, via a system bus 107, to the ROM 103, the RAM 102, the storage 104, an operation unit interface (I/F) 106, a network I/F 110, a universal serial bus (USB) host I/F 113, and an image bus I/F 105. The operation unit I/F 106 is an interface to the operation unit 112 having a touch panel, and outputs image data, which is to be displayed on the operation unit 112, to the operation unit 112. The operation unit I/F 106 transmits information, which is input to the operation unit 112 by a user, to the CPU 101. The network I/F 110 is an interface for connecting the information processing apparatus to a local area network (LAN).

The USB host I/F 113 is an interface unit that communicates with a USB storage 114. The USB host I/F 113 is an output unit that is used to store data stored in the storage 104 into the USB storage 114. The USB host I/F 113 receives data stored in the USB storage 114, and transfers the data to the CPU 101. The USB storage 114, as an external storage device, is detachable from and detachable to the USB host I/F 113. A plurality of USB devices including the USB storage 114 can be connected to the USB host I/F 113.

The image bus I/F 105 as a bus bridge connects the system bus 107 to an image bus 108 that transfers image data at high speed. The image bus I/F 105 also converts a data format. The image bus 108 includes a peripheral component interconnect (PCI) bus or an Institute of Electrical and Electronics Engineers (IEEE) 1394 bus. On the image bus 108, a device I/F 120, a scanner image processing unit 180, and a printer image processing unit 190 are connected. The device I/F 120 is connected to the scanner 170 and the printer 195, and performs synchronous-asynchronous conversion of image data. The scanner image processing unit 180 corrects, processes, and edits input image data. The printer image processing unit 190 performs operations, such as image correction and resolution conversion in accordance with the printer 195, with respect to printout image data.

Figure 2:
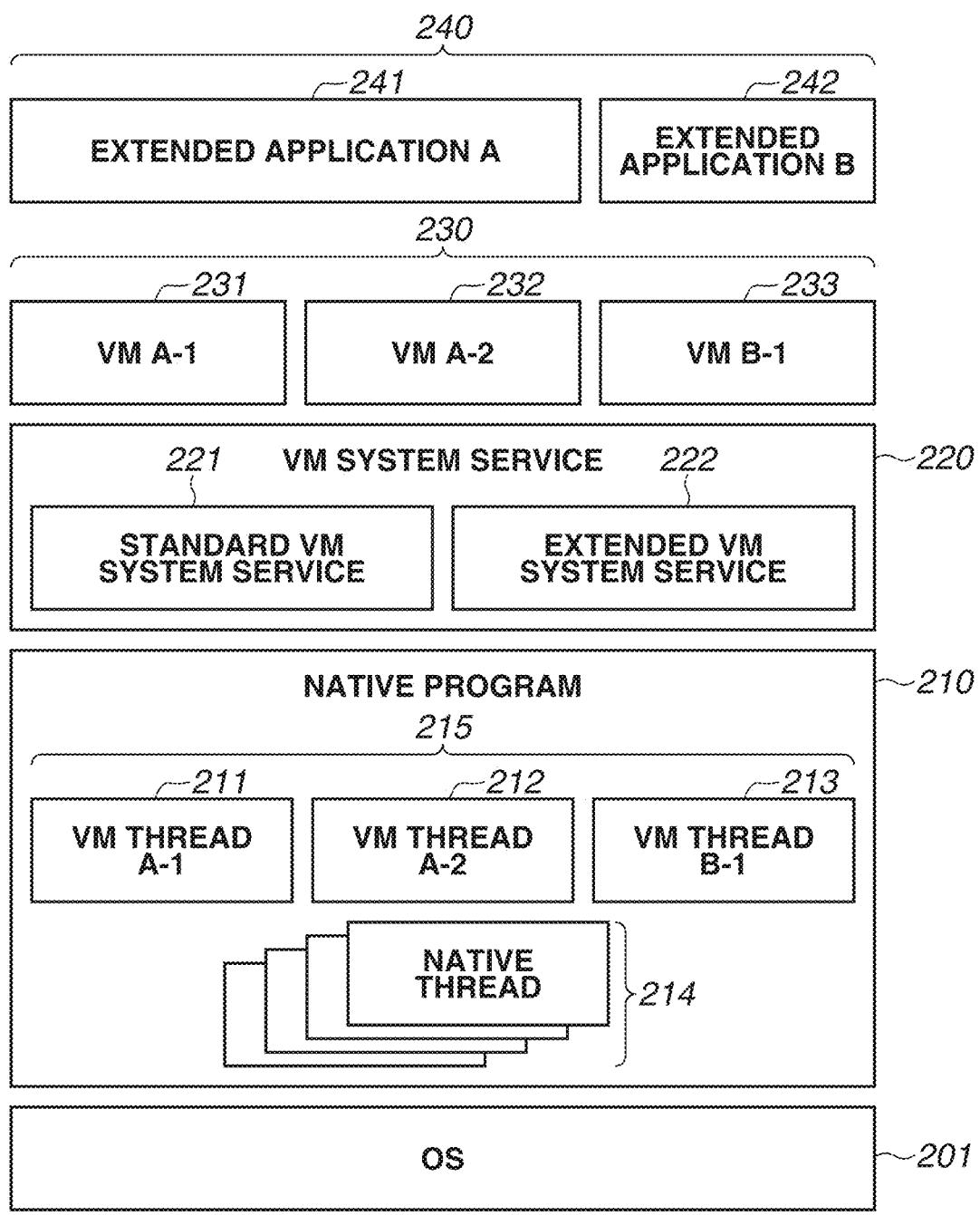
FIG. 2 is a block diagram illustrating a software configuration of the information processing apparatus according to the present exemplary embodiment.

FIG. 2 is a block diagram illustrating an example of an extended application execution environment of the information processing apparatus. The CPU 101 loads a program stored in the storage 104 to the RAM 102, and executes the program to provide each module illustrated in FIG. 2. A native program 210 for control of an image processing unit such as a printer, a facsimile device, and a scanner operates on an OS 201, which is an operating system. A virtual machine (VM) 230 as an extended application execution environment operates on the OS 201. The VM 230 is a module that interprets and executes a program for controlling an extended application. The extended application always operates on the VM 230. A program that operates on the VM 230 is executed by a command that is dedicated to the VM 230 and is different from a command that operates on the CPU 101. Such a command dedicated to a VM is referred to as a bytecode. On the other hand, a command dedicated to a CPU is referred to as a native code. The VM sequentially interprets and processes such bytecodes, so that a native code and a VM bytecode operate on the CPU 101. There are different types of VMs. One type sequentially interprets and processes bytecodes as is. Another type converts a bytecode into a native code and then executes the native code. In the present exemplary embodiment, the VM 230 is the former type. However, the VM 230 can be the latter type. Generally, if types of CPUs differ, commands that operate on the CPUs are incompatible. Similarly, if VMs differ, commands that operate on the VMs are incompatible. In the present exemplary embodiment, the VM 230 is a software module that operates on the CPU 101. However, the VM 230 can be a hardware module.

The native program 210 includes a native thread 214 for control of the image processing units such as a printer, a facsimile device, and a scanner, and a VM thread 215 for operation of the VM 230. The number of VM threads corresponds to the number of VMs 230. Herein, three threads 211, 212, and 213 are generated.

A VM system service 220 is a utility library that is commonly used by extended applications. A function of the VM system service 220 is invoked from an extended application 240, so that time/labor for development of an extended application can be saved, and thus each module of the information processing apparatus can be accessed. The VM system service 220 includes a standard VM system service 221 that provides minimum operations as a VM, and an extended VM system service 222 that provides an access to each module of the information processing apparatus and an OS function. The standard VM system service 221 includes a function of loading an extended application. The VM 230 executes an application programming interface (API) designated by a bytecode inside an extended application, so that the VM system service 220 associated with the API is invoked.

The VM 230 executes the extended application 240. The VM 230 is generated for each thread of an extended application. As illustrated in FIG. 2, a VM A-1 231 and a VM A-2 232 for operation of two threads in an extended application A 241 and a VM B-1 for operation of one thread in an extended application B 242 are generated.

On a main menu screen displayed on the operation unit 112 of the information processing apparatus, an icon for each extended application is displayed. If the operation unit I/F 106 detects that an icon has been selected by a user via the operation unit 112, the operation unit IF 106 transmits the icon selection to the CPU 101. Upon receipt of the icon selection, the CPU 101 activates the extended application selected by the user.

Figure 3:
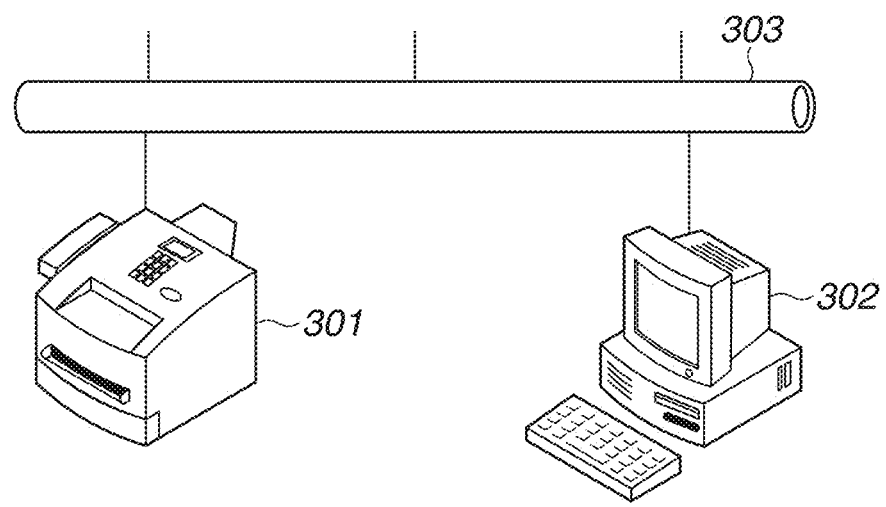
FIG. 3 is a diagram illustrating a system configuration according to the present exemplary embodiment.

FIG. 3 is a diagram illustrating an example of equipment configuration at the time of installation of an extended application of a print system including the information processing apparatus according to the present exemplary embodiment. This print system includes the image forming apparatus 301 serving as an information processing apparatus, an Ethernet® cable 303, and a host personal computer (PC) 302.

The image forming apparatus 301 provides an extended application installation unit to the host PC 302 via the Ethernet® cable 303. The host PC 302 includes extended application data, and uses the extended application installation unit provided by the image forming apparatus 301 to install an extended application in the image forming apparatus 301.

Figure 4:
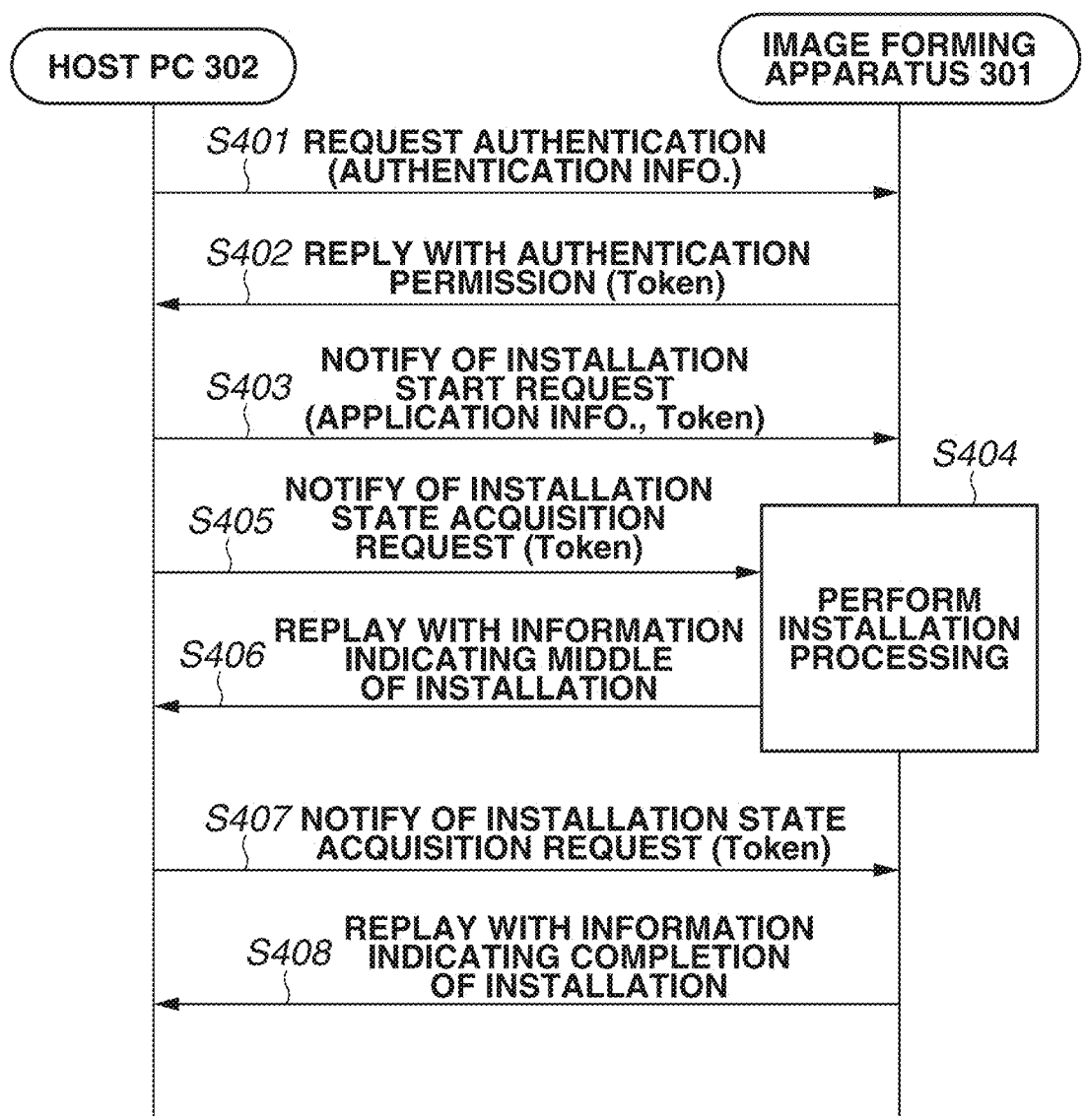
FIG. 4 is a sequence diagram of operations according to the present exemplary embodiment.

FIG. 4 is diagram illustrating a procedure performed when extended application data retained in the host PC 302 is installed in the image forming apparatus 301. In step S401, the host PC 302 requests authentication so that extended application data is installed in the image forming apparatus 301. Herein, the host PC 302 notifies the image forming apparatus 301 of information (user identification (ID) and a password) that is necessary for authentication. In step S402, the image forming apparatus 301, which has received the authentication request, checks authentication information. If there is no problem with the authentication information, the image forming apparatus 301 replies with authentication permission. At this time, the image forming apparatus 301 replies with a character string (i.e., Token) indicating authentication permission together with the authentication permission. In step S403, upon receipt of the authentication permission, the host PC 302 notifies the image forming apparatus 301 of installation start request. Herein, the image forming apparatus 301 is notified of extended application data retained in the host PC 302 and the Token acquired in step S402. In step S404, the image forming apparatus 301, which has received the installation start request, checks whether the Token is correct. If there is no problem with the Token, the extended application is installed in the image forming apparatus 301. In step S405, the host PC 302 notifies the image forming apparatus 301 of an installation state acquisition request. At this time, the host PC 302 notifies the image forming apparatus 301 of the Token acquired in step S402. In step S406, the image forming apparatus 301, which has received the installation state acquisition request, checks whether the Token is correct. If there is no problem with the Token, the image forming apparatus 301 replies with information indicating that the installation is being performed because the processing is in the middle of installation in step S404. In step S407, the host PC 302 notifies the image forming apparatus 301 of an installation state acquisition request again. In step S408, the image forming apparatus 301, which has received the installation state acquisition request, checks whether the Token is correct. If there is no problem with the Token, the image forming apparatus 301 replies with information indicating completion of the installation because the installation has been completed.

Through the above described processing, the extended application data retained in the host PC 302 is installed in the image forming apparatus 301.

Figure 5:
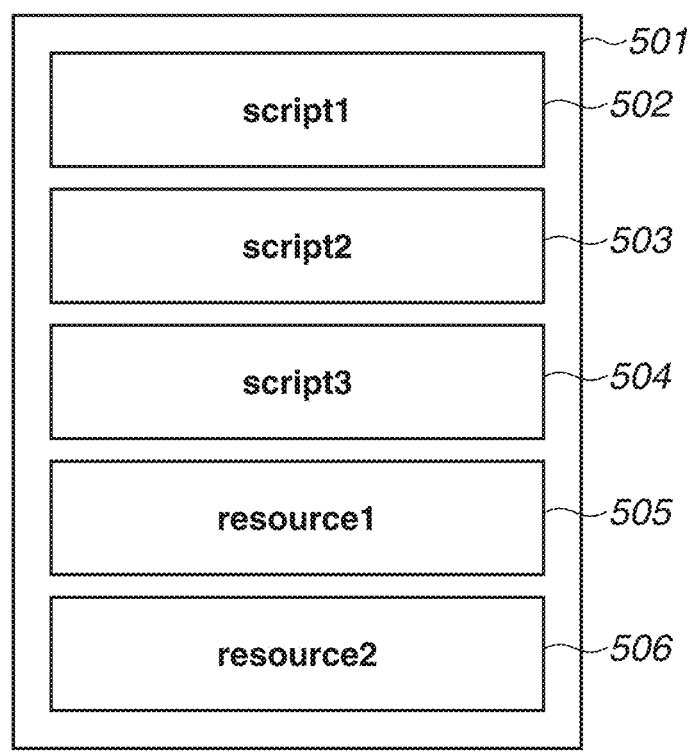
FIG. 5 is a block diagram illustrating an archive including data for installing an extended application according to the present exemplary embodiment.

FIG. 5 is a diagram illustrating an archive 501 including data for installing an extended application. The archive 501 is data in which all pieces of data forming an extended application are summarized into a single piece of data. There are broadly two kinds of files that form an extended application. One is a script file (e.g., script files 502 through 504) in which an operation of an extended application is written in a program language. The other is a resource file (e.g., resource files 505 and 506) in which data such as image data and a display message to be used by an application is stored.

Installation of such an archive by installation processing described below executes bytecode processing for a script. Thus, bytecode processing time at the time of execution of the extended application is reduced.

Figure 6:
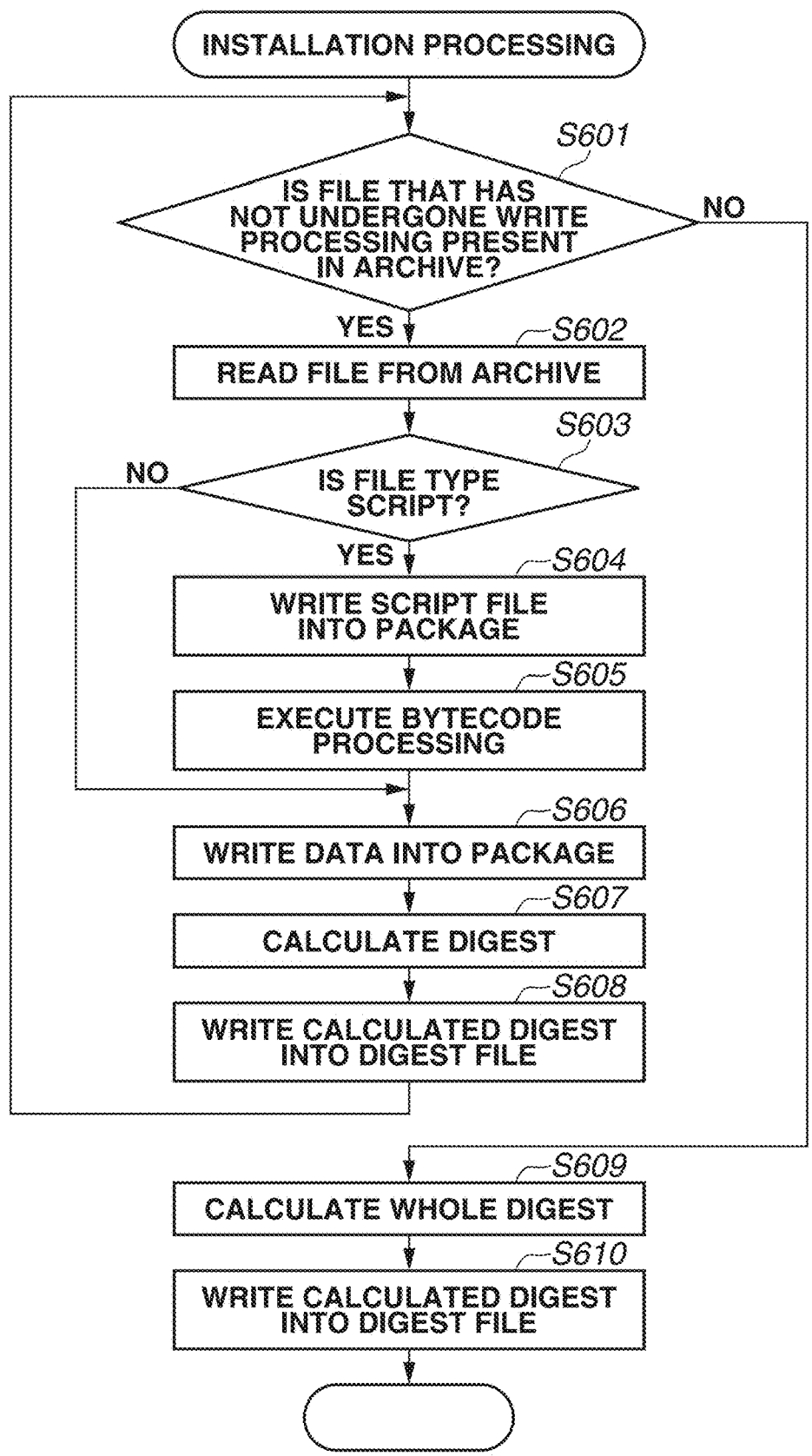
FIG. 6 is a flowchart of operations according to the present exemplary embodiment.

FIG. 6 is a flowchart illustrating processing performed when the archive 501 illustrated in FIG. 5 is installed and an extended application executable package is generated. In this processing, an extended application executable package 701 and a digest file 731 are generated from the archive 501. The extended application executable package 701 and the digest file 731 are described below. The processing illustrated in FIG. 6 is executed on the CPU 101 based on a command that is loaded into the RAM 102.

In step S601, the CPU 101 checks whether a file that has not undergone write processing into a package from an archive is present. If a file which has not undergone the write processing into a package is included in the archive (YES in step S601), the operation proceeds to step S602. If all of files in the archive have undergone the write processing into a package (NO in step S601), the operation proceeds to step S609.

In step S602, the CPU 101 reads the file that has not undergone the write processing into a package from the archive. In step S603, the CPU 101 determines whether the read file is a script type. If the read file is the script type (i.e., 502 through 504) (YES in step S603), the operation proceeds to step S604. If the read file is a resource file (i.e., 505 and 506) (NO in step S603), the operation proceeds to step S606. In step S604, the CPU 101 writes the read script file into the package. In step S605, the CPU 101 executes bytecode processing by which the read script file is converted into a bytecode that is compliant with a version of the VM. In step S606, the CPU 101 writes the data into the package. In step S607, the CPU 101 calculates a digest of the data written into the package, and the processing proceeds to step S608. In step S608, the CPU 101 writes the calculated digest into a digest file 731, and the operation returns to step S601.

In step S609, the CPU 101 calculates a digest of all pieces of data written into the package. In step S610, the CPU 101 writes the calculated digest into the digest file 731, and the operation ends.

With such processing, all of the script files necessary for execution of the extended application are byte-coded at the time of installation, and the byte-coded script files are retained in a single package file.

Figure 7:
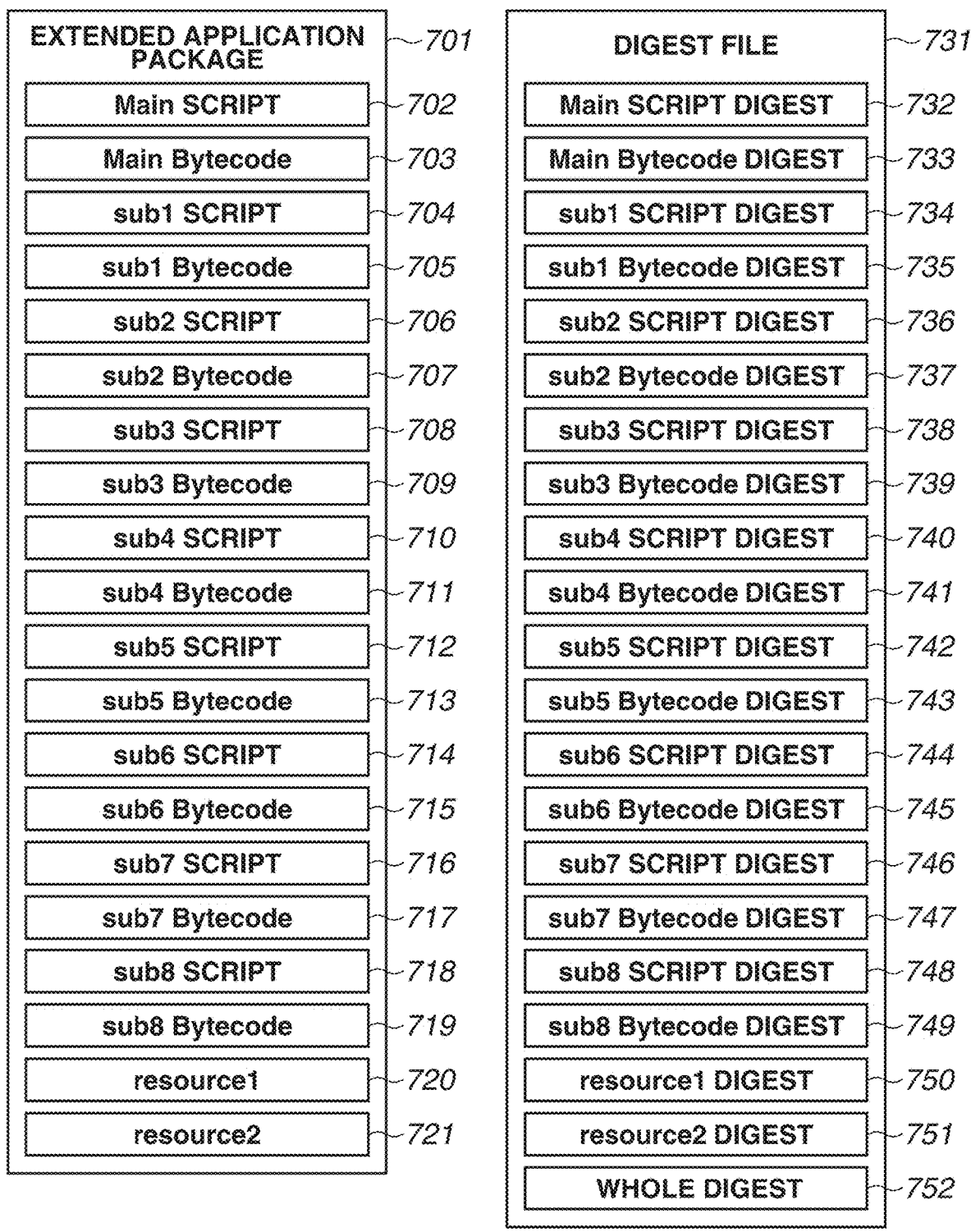
FIG. 7 is a block diagram illustrating an installed extended application package and a digest file according to the present exemplary embodiment.

FIG. 7 is a block diagram of the extended application package 701 and the digest file 731 generated by the installation processing illustrated in FIG. 6 based on the archive 501. The extended application package 701 and the digest file 731 illustrated in FIG. 7 are stored in the ROM 103 or the storage 104 as a storage unit.

The extended application package 701 retains all pieces of data necessary for execution of an extended application. The data to be retained includes scripts before byte-coding (e.g., scripts 702, 704, 706, 708, 710, 712, 714, 716, and 718). The data to be retained includes scripts after byte-coding (e.g., scripts 703, 705, 707, 709, 711, 713, 715, 717, and 719), and resources (e.g., resources 720 and 721). Collection of all pieces of data necessary for execution of an extended application into a single package can reduce the amount of disk access that occurs when a file is searched, and can enhance efficiency in file buffering. The digest file 731 retains a digest of the extended application package 701. The digest to be retained includes digests (e.g., digests 732 through 751) corresponding to respective files to be included in the extended application package 701, and a whole digest 752 for whole of the extended application package 701. Each of the digests retained in the digest file 731 is used to detect an alteration in an application by an alteration detection method described below. The extended application package 701 and the digest file 731 are generated for each installed extended application.

Figure 8:
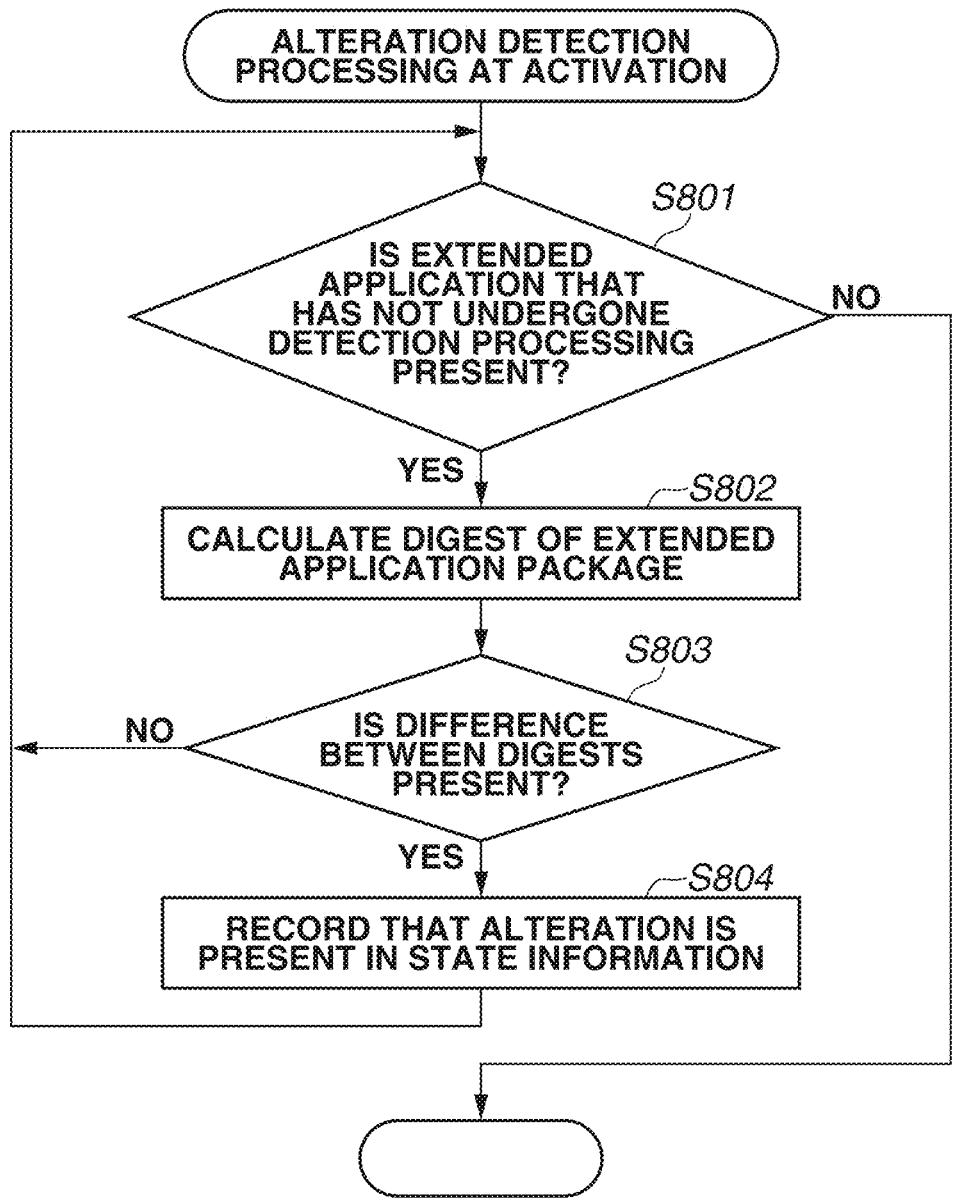
FIG. 8 is a flowchart of operations according to the present exemplary embodiment.

FIG. 8 is a flowchart illustrating alteration detection processing performed on an extended application at the time of activation of the image forming apparatus 301. The detection processing is executed on the CPU 101 based on a command that is loaded into the RAM 102. In step S801, the CPU 101 checks whether an extended application that has not undergone alteration detection processing is present. If an extended application that has not undergone alteration detection processing is present (YES in step S801), the operation proceeds to step S802. If there is no extended application that has not undergone alteration detection processing (NO in step S801), the operation ends. In step S802, the CPU 101 calculates a digest of the extended application package 701 as a whole. In step S803, the CPU 101 compares the digest calculated in step S802 with a whole digest 752, which is stored in the digest file 731, for whole of the extended application package. If there is no difference (NO in step S803), the operation proceeds to step S801. If there is a difference (YES in step S803), the operation proceeds to step S804. In step S804, since the presence of a difference between the digests indicates that the extended application has been altered, the CPU 101 records "present" of an alteration in alteration state information 1800 described below. Then, the operation proceeds to step S801. The alteration state information 1800 is used in processing described below. In the alteration detection processing at the time of activation, comparison is made for the whole digest of the extended application package 701. Hence, an alteration can be detected even if only one alteration is present somewhere in the package.

Figure 9:
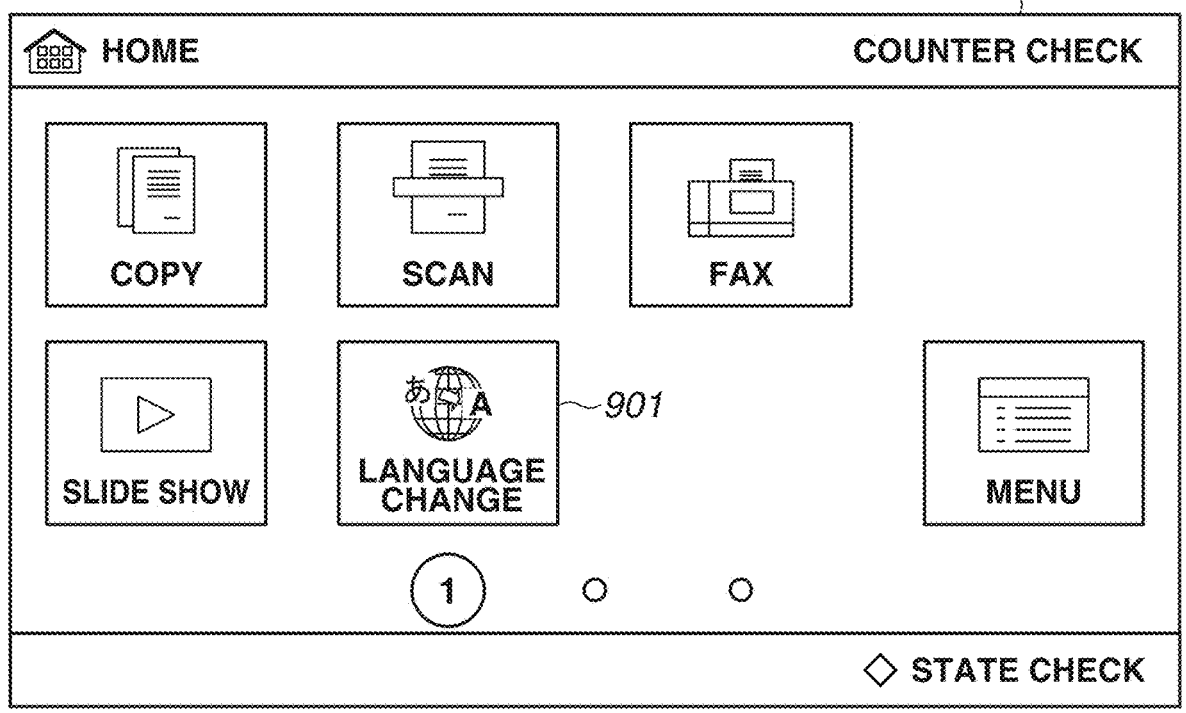
FIG. 9 is a display example of an operation unit according to the present exemplary embodiment.

FIG. 9 is a display example of the operation unit 112 after the image forming apparatus 301 is activated. On the operation unit 112, icons indicating functions of the image forming apparatus 301 are displayed. Herein, an icon 901 represents a function of an extended application. The icon 901 is displayed by icon registration processing described below is performed.

Figure 10:
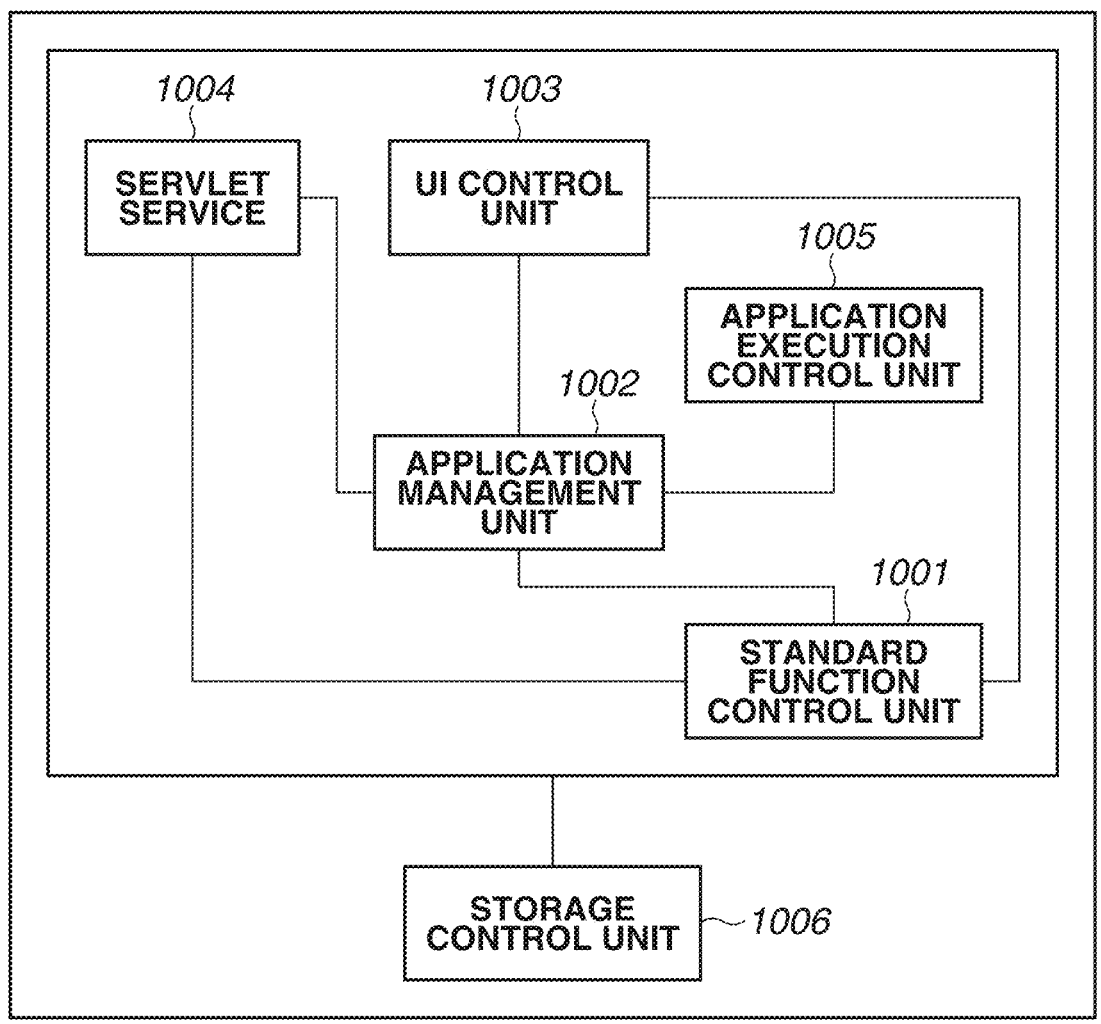
FIG. 10 is a block diagram of software configuration according to the present exemplary embodiment.

FIG. 10 is a configuration diagram illustrating a software module that operates on the CPU 101 of the image forming apparatus 301 according to the present exemplary embodiment. A servlet service 1004 is a module that allocates processing to a module (an application management unit 1002 or a standard function control unit 1001) based on an accessed uniform resource locator (URL) when a hypertext transfer protocol (HTTP) is accessed via the network I/F 110. A user interface (UI) control unit 1003 is a module that displays a screen on the operation unit 112 to receive an operation from a user, and notifies an appropriate module (the application management unit 1002 or the standard function control unit 1001) of information about the operation received from the user. The application management unit 1002 is a module that manages operation such as installation and activation of the extended application. An application execution control unit 1005 is a module that controls execution of the application activated by the application management unit 1002. In particular, the application execution control unit 1005 controls the VM thread 215, the VM system service 220, the VM 230, and the extended application 240. A storage control unit 1006 is a module that manages recording of setting information about the image forming apparatus 301. Each of the modules accesses the storage control unit 1006 to refer to or set a setting value. The standard function control unit 1001 is a module that controls functions such as a copying function and a facsimile function that are standard functions of the image forming apparatus 301. The standard function control unit 1001 further performs other control (e.g., control of the USB host I/F 113) necessary for the image forming apparatus 301.

Figure 11:
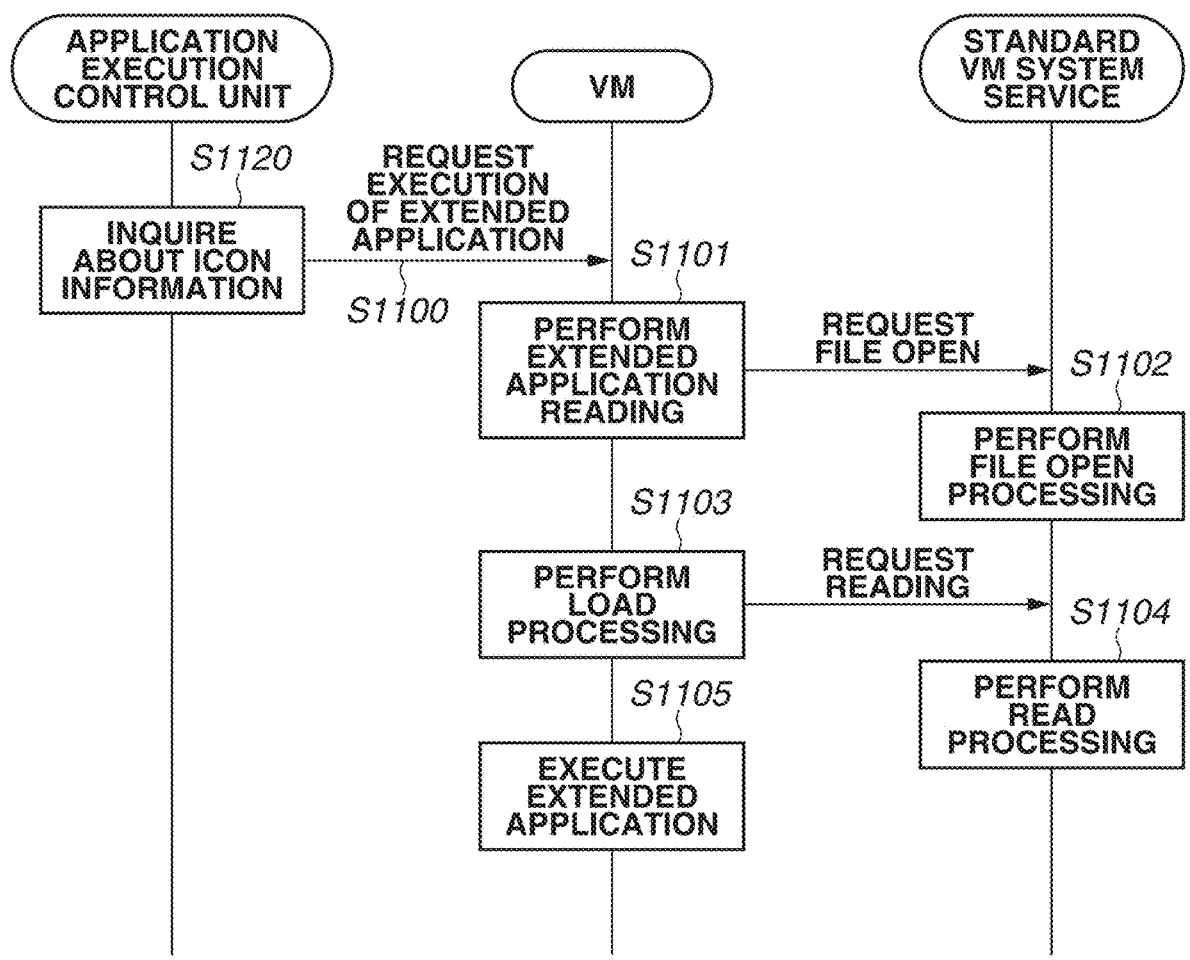
FIG. 11 is a sequence diagram of operations according to the present exemplary embodiment.

FIG. 11 is a diagram illustrating processing performed by the application execution control unit 1005 when an extended application icon is registered at the time of activation. The processing is executed on the CPU 101 in accordance with a command that is loaded into the RAM 102.

In step S1120, since an extended application retains extended application icon information, the application execution control unit 1005 executes extended application icon information inquiry processing to inquire about the icon information. Before execution of the inquiry processing, the application execution control unit 1005 checks whether an alteration in a target application has been detected based on the alteration detection processing at the time of activation illustrated in FIG. 8. If an alteration has not been detected, the operation proceeds to step S1100. In step S1100, the application execution control unit 1005 activates a VM to execute an extended application, and requests execution of an icon information inquiry script of the installed extended application with respect to the VM.

In step S1101, the VM issues a file open request to a standard VM system service so that the VM reads the designated script. In step S1102, upon receipt of the file open request, the standard VM system service searches the extended application package 701 for the designated file and opens the designated file. In step S1103, if the opening of the file has failed, load processing is put into failure. If the opening of the file has succeeded, the VM issues a file read request to the standard VM system service so that the VM loads information recorded in a script from the opened file. In step S1104, upon receipt of the file read request, the standard VM system service reads the data from a designated file handle. In step S1103, the VM waits until completion of the read processing performed by the standard VM system service, and performs load processing. After completing the load processing, the VM sets the script to loaded. In step S1105, the VM executes the loaded script. The processing for registering an icon is described in the loaded script, so that the icon is registered by the VM executing the script.

Figure 12:
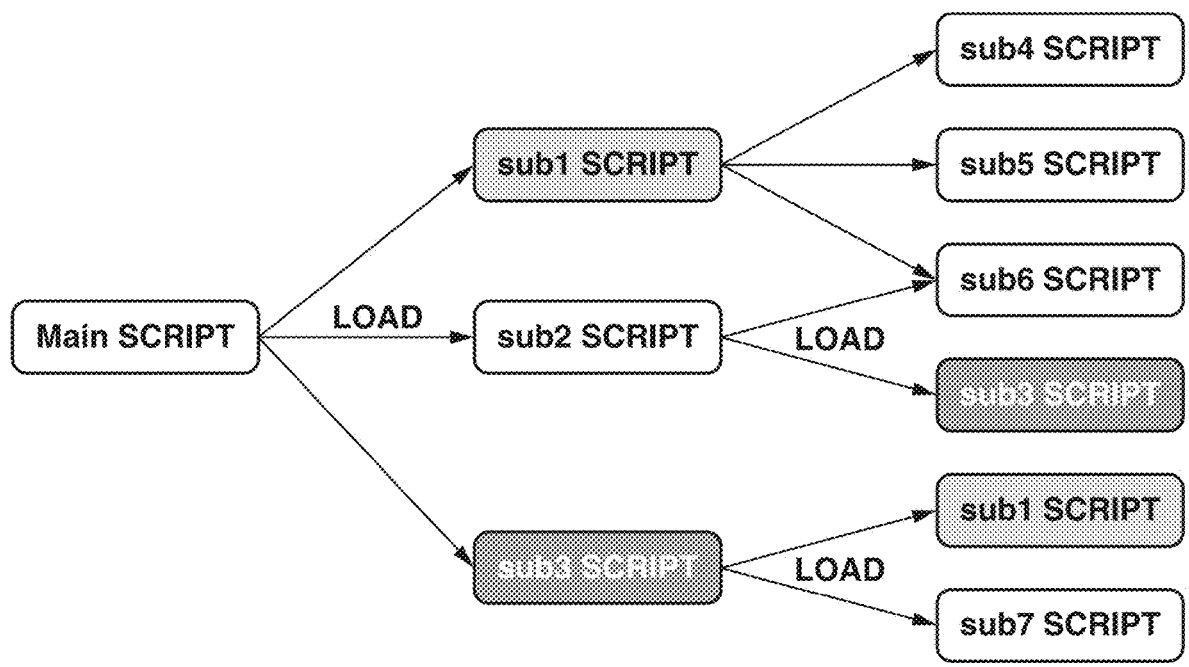
FIG. 12 is a block diagram illustrating a dependency relation between scripts in the extended application according to the present exemplary embodiment.

FIG. 12 is a diagram illustrating a dependency relation between scripts in an extended application.

In general, if an application is to be executed by a PC, the PC reads executable files as a whole, loads the executable files into a memory, and then executes the application. However, the image forming apparatus 301 does not have memory resources as rich as such a PC. Thus, the image forming apparatus 301 divides an extended application into a plurality of scripts on a function basis, and loads the script having a function necessary for processing of the extended application at any time to execute the extended application. Such a configuration reduces memory resources that are necessary to execute the extended application.

In FIG. 12, if a main script is loaded/executed, sub 1, sub 2, and sub 3 scripts are loaded/executed. FIG. 12 further indicates that sub 4, sub 5, sub 6, sub 3, sub 1, and sub 7 scripts are loaded/executed. A dependency relation between scripts differs for each extended application. Similar to the sub 1 and the sub 3 scripts illustrated in FIG. 12, the same script can be loaded for multiple times. Even in the same extended application, a script to be loaded differs depending on a content of processing to be performed. Since a sub-script is loaded at any time as needed, a duration of time between activation of the application and loading of the sub-script may differ.

Accordingly, the image forming apparatus 301 having limited memory resources loads a sub-script when needed, instead of loading the executable files as a whole into a memory. Alteration detection processing may be performed only at the time of activation of an extended application. In such a case, if an alteration is made between activation of the extended application and loading of a sub-script, the alteration cannot be detected. Thus, alternation detection processing always needs to be performed at the time of script loading. However, a script is stored in the extended application package 701. As for detection of an alteration in the extended application package 701, a digest of the extended application package 701 as a whole needs to be calculated. The larger the calculation target, the longer the calculation time. Hence, calculation of a digest of the extended application package 701 as a whole for each script loading prolongs processing time. In the file open processing in step S1102 illustrated in FIG. 11, detection processing that can reduce processing time is performed. Details of such processing are described in below.

Figure 13:
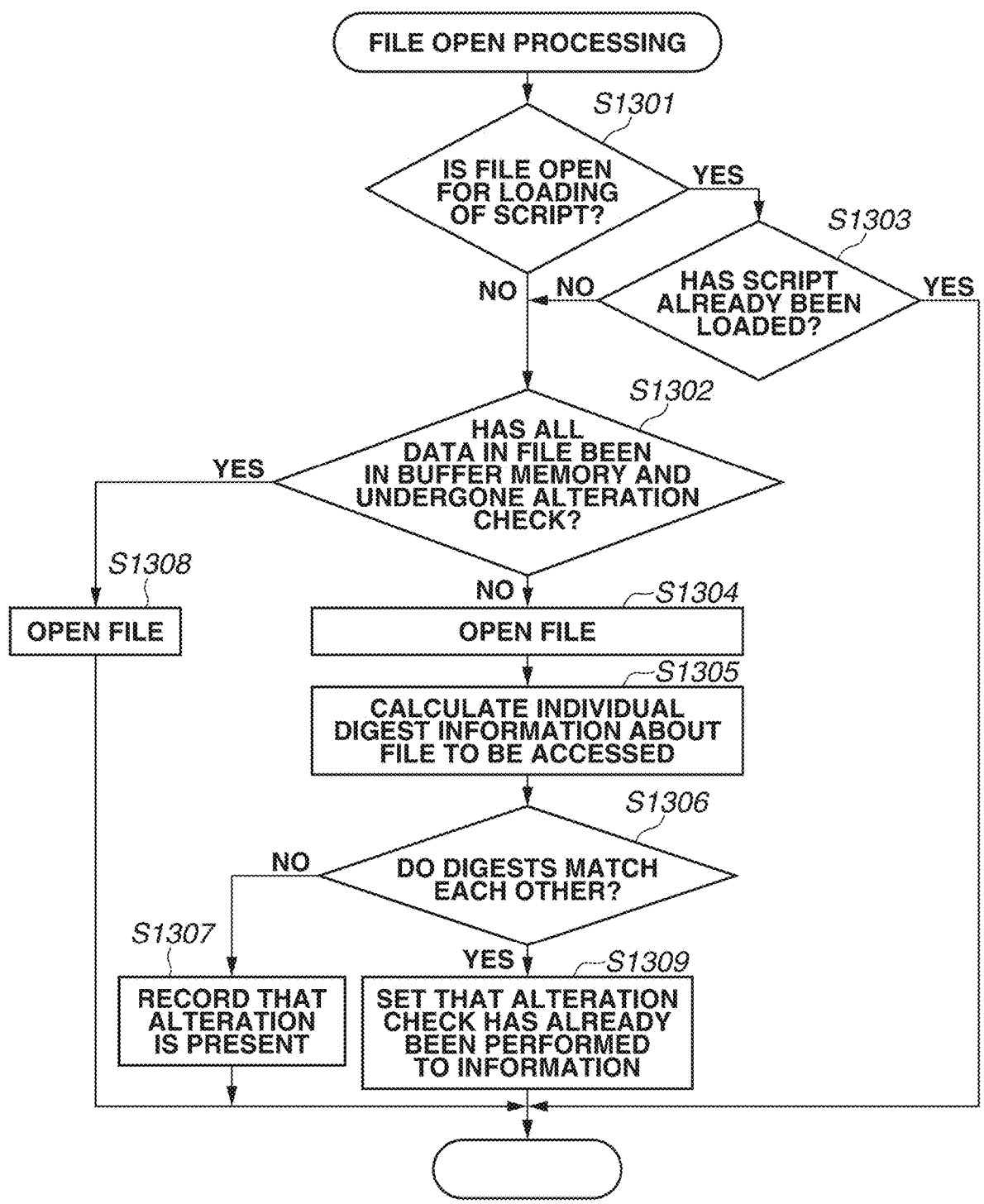
FIG. 13 is a flowchart of operations according to the present exemplary embodiment.

FIG. 13 is a flowchart illustrating details of the file open processing in step S1102 illustrated in FIG. 11. The processing is executed on the CPU 101 based on a command loaded into the RAM 102.

In step S1301, the CPU 101 determines whether file open is for loading of a script or access to a resource file. The purpose of the file open includes opening to load a script to a VM and execute and opening to use a file as mere data.

Processing changes depending on the purpose. If file open is for the loading (YES in step S1301), the operation proceeds to step S1303. If file open is for the access, that is, not the loading (NO in step S1301), the operation proceeds to step S1302. In step S1302, the CPU 101 determines whether all pieces of data in a file to be opened have been in a buffer memory 1400 described below, and has undergone an alteration check based on inside-package file state information 1600 described below. If such conditions are satisfied (YES in step S1302), the operation proceeds to step S1308. If such conditions are not satisfied (NO in step S1302), the operation proceeds to step S1304. In step S1303, the CPU 101 determines whether a script to be loaded has already been loaded. If the script has already been loaded (YES in step S1303), the operation ends. If the script has not been loaded (NO in step S1303), the operation proceeds to step S1302. In step S1304, the CPU 101 searches the extended application package for the designated file, and opens the designated file. In step S1305, the CPU 101 calculates individual digest information (a digest value) about a file to be accessed. In step S1306, the CPU 101 acquires an individual digest corresponding to the file to be accessed from the digest file 731, and compares the acquired individual digest with the digest information acquired in step S1305. If the individual digest matches the digest information as a result of the comparison (YES in step S1306), the operation proceeds to step S1309. If the individual digest does not match the digest information (NO in step S1306), the operation proceeds to step S1307. In step S1307, the CPU 101 determines that the extended application package 701 has been altered, records "altered" in the alteration state information 1800 described below, and puts the file open processing into failure. Then, the operation ends. In step S1309, the CPU 101 sets the inside-package file state information 1600 such that the alteration check has already been performed, and the operation ends. In step S1308, the CPU 101 accesses and opens a file.

With the file open processing, only a digest of data necessary for execution of an application included in an application package is calculated in detection of an alteration in the application at runtime. Thus, calculation of a digest of data that is not necessary for execution of the application can be omitted. If data is present on a buffer or is already loaded, digest calculation can also be omitted.

For example, if a script configuration of an application has a relation illustrated in FIG. 12, a main script is first opened by the processing illustrated in FIG. 13 (i.e., S1102 in FIG. 11). Then, in step S1103, the opened main script is loaded, and in step S1105, the loaded script is executed. In the course of execution of the main script, a sub 1 script is opened, the opened sub 1 script is loaded, and then the loaded sub 1 script is executed. Further, in the course of execution of the sub 1 script, sub 4, sub 5, and sub 6 scripts are opened, the opened sub 4, sub 5, and sub 6 scripts are loaded, and then the loaded sub 4, sub 5, and sub 6 scripts are executed. Subsequently, a sub 2 script is opened, the opened sub 2 script is loaded, and then the loaded sub 2 script is executed. In the course of execution of the sub 2 script, the sub 6 script is opened. However, the sub 6 script is already loaded. Thus, in the open processing, calculation of a digest necessary for detection of an alteration can be omitted.

Although a script configuration differs for each application, a script is generally divided and created for each function. Moreover, a script to be executed differs depending on a function. For example, scripts to be executed differ between an icon information inquiry function illustrated in FIG. 11 and a function for activating an application after an icon is clicked. In a case where a digest is calculated for an application package as a whole similar to the conventional technique, a digest is calculated even for a file that is not necessary for the calculation. In the present exemplary embodiment, a digest is calculated for each script to be loaded, so that alteration detection can be performed in a minimum amount of processing time. Therefore, a digest value is not calculated for a file other than a file to be loaded.

FIG. 14 is a block diagram illustrating contents of a buffer memory in which contents of an accessed extended application package are retained in a buffering manner.

The extended application package is retained in the storage 104. Since access to data in a storage medium takes longer time than that in a RAM, data accessed once is retained inside a RAM. If the same data is to be accessed next time, the data retained inside the RAM is used to shorten access time. This is called buffering.

The buffer memory 1400 includes an offset area in which an offset of an extended application package is recorded, and a data area in which contents of the extended application package are retained. In offset recording, offsets are recorded from the top of the extended application package. An offset with 0xffffffff indicates that a buffer is not being used. Herein, a pair of the offset area and the data area is referred to as a buffer block.

Figure 15:
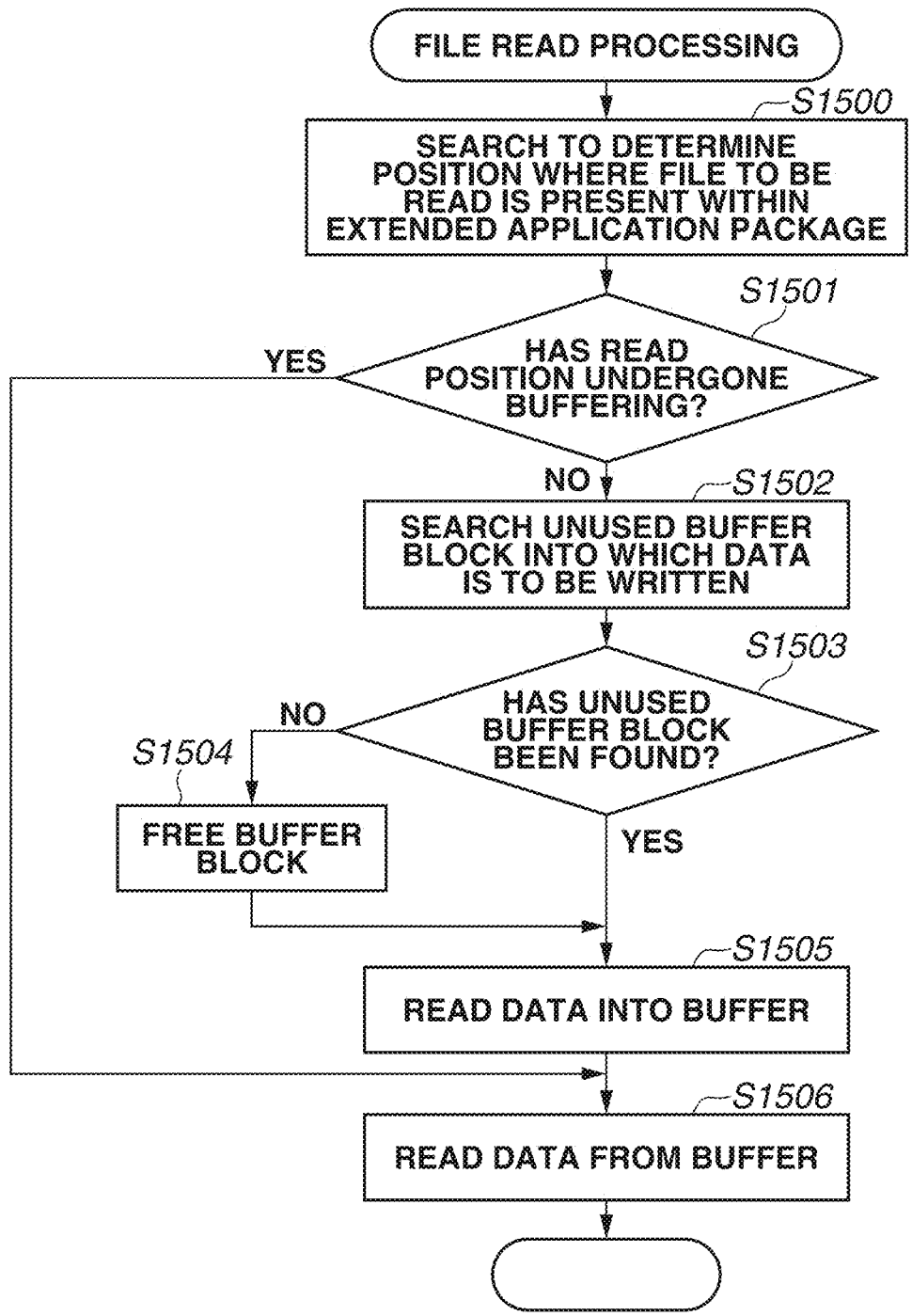
FIG. 15 is a flowchart of operations according to the present exemplary embodiment.

FIG. 15 is a flowchart illustrating details of the file read processing in S1104 illustrated in FIG. 11. The file reading processing is executed on the CPU 101 based on a command loaded into the RAM 102.

In step S1500, the CPU 101 makes a search to determine a position where a file to be read is present within an extended application package. In step S1501, the CPU 101 determines whether data including such a position has undergone buffering, from the buffer memory 1400. If the data has undergone buffering (YES in step S1501), the operation proceeds to step S1506. If the data has not undergone buffering (NO in step S1501), the operation proceeds to step S1502. In step S1502, the CPU 101 searches the buffer memory 1400 for an unused buffer block to retain data read from a file. In step S1503, the CPU 101 determines whether an unused buffer block has been found. If an unused buffer block has not been found (NO in step S1503), the operation proceeds to step S1504. If there is an unused buffer block (YES in step S1503), the operation proceeds to step S1505. In step S1504, since an unused buffer block is not present, the CPU 101 selects one buffer block out of buffer blocks, and frees up the selected buffer block to enter an unused state. The CPU 101 clears a file alteration checked state retained in this buffer block to "not yet" in the inside-package file state information 1600 described below. In step S1505, the CPU 101 loads the extended application package data into the selected unused buffer block. In step S1506, the CPU 101 reads data from the buffer block retaining data of the reading target file.

With the file read processing, data inside the extended application undergoes buffering, and time for which a frequently accessed file is read can be reduced.

FIG. 16 is a block diagram illustrating the inside-package file state information 1600 in which a state of a file inside an extended application package is retained.

The inside-package file state information 1600 includes four pieces of information that is an offset position of a file inside extended application, size information, information indicating whether the file has undergone an alteration check, and a file path. The four pieces of information are present for each of all the files inside the extended application package. When the device is activated, such information is configured, and every alteration checked information is cleared to "not yet".

Figure 17:
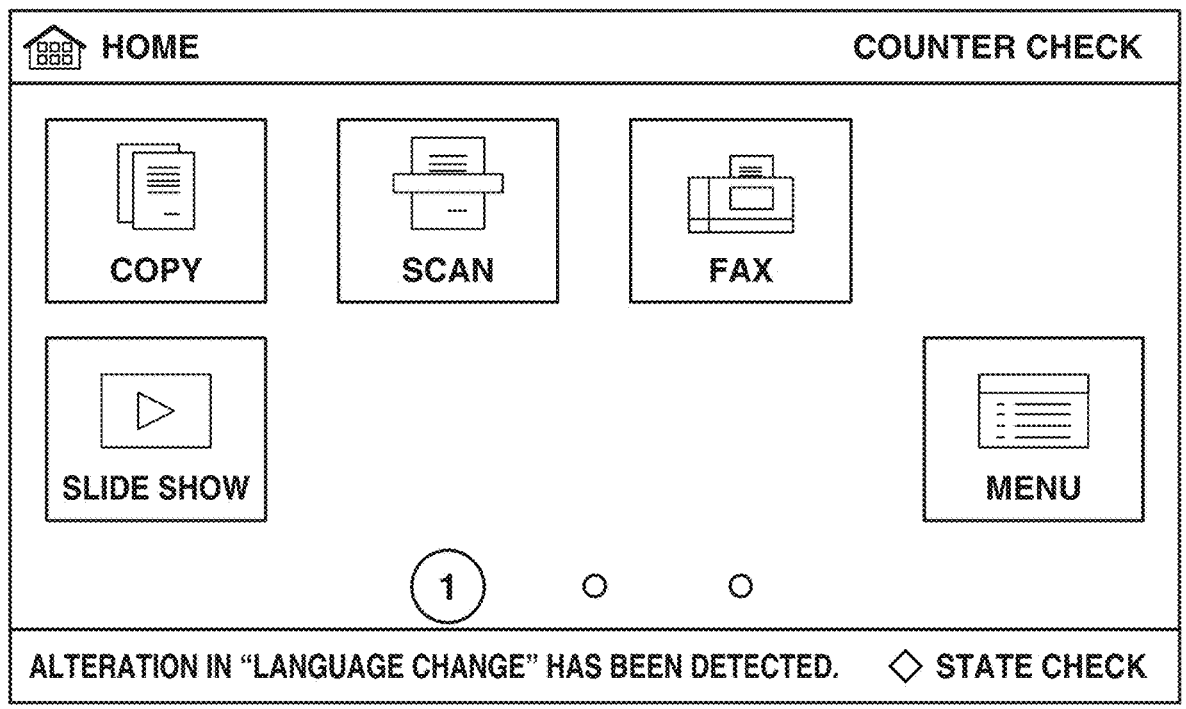
FIG. 17 is a display example of the operation unit at the time of detection of an alteration in the extended application according to the present exemplary embodiment.

FIG. 17 illustrates an example in which alteration detection information is displayed on the operation unit 112 so that detection of an alteration is notified. In the present exemplary embodiment, the image forming apparatus 301 displays a message indicating that an alteration in the application has been detected in a status line allocated to a lower portion of the screen.

FIG. 18 is a block diagram illustrating the alteration state information 1800 indicating a state whether an extended application has been altered. The alteration state information 1800 includes identification (ID) that identifies an extended application, and information indicating whether an alteration has been detected.

In the present embodiment, comparison processing of digest information is used as the alteration detection processing. However, other processing can be used as the alteration detection processing as long as the processing can detect a file alteration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-137629, filed Jul. 23, 2018, which is hereby incorporated by reference herein in its entirety.

What is claimed is:

1. An information processing apparatus comprising:
a storage; and
one or more controllers including one or more processors and one or more memories, the one or more controllers configured to:
store an application package including a plurality of scripts in the storage;
load a script to execute a function from the plurality of scripts included in the application package, the application package including the script which is to be loaded to execute the function and a script which is not to be loaded to execute the function;
detect an alteration of the script to be loaded based on digest information calculated from the script to be loaded and digest information corresponding to the scripts stored in the storage;
execute the function using the loaded script, on condition that an alteration of the script to be loaded is not detected,
wherein the one or more controllers do not execute detecting an alteration of the script which is not to be loaded to execute the function included in the application package;
when the script to execute the function included in the application package is loaded to a virtual machine, record a fact that the script has been loaded; and
before the script is loaded to the virtual machine, determine whether the script has been loaded based on the fact, and cause a detection of alteration of the loaded script not to be performed if the script is already loaded.

2. The information processing apparatus according to claim 1, wherein the one or more controllers are further configured to provide a message based on a result of comparing the digest information calculated from the script to be loaded and the digest information corresponding to the scripts stored in the storage.

3. The information processing apparatus according to claim 1, wherein the one or more controllers are further configured to:
open a file archived in a package file; and
determine whether to execute alteration detection processing depending on a type of access to the file.

4. The information processing apparatus according to claim 1, wherein the one or more controllers are further configured to:
when a file archived in a package file is read, store data of the read file in a buffer memory;
when alteration detection processing is performed on a file archived in the package file, record a fact that the file has undergone an alteration check; and
open a file archived in the package file without alteration detection processing if data of the file has undergone buffering and an alteration check.

5. The information processing apparatus according to claim 1, wherein the one or more controllers are further configured to cause a file not to be opened based on a result of comparing the digest information calculated from the script to be loaded and the digest information corresponding to the scripts stored in the storage.

6. The information processing apparatus according to claim 1, wherein individual digest information about a file stored beforehand in the storage is calculated at time of installation of the application package.

7. The information processing apparatus according to claim 1, wherein the one or more controllers are further configured to report that an archived file has been altered, if individual digest information about a file differs from individual digest information about a file stored beforehand in the storage based on a result of comparing the digest information calculated from the script to be loaded and the digest information corresponding to the scripts stored in the storage.

8. The information processing apparatus according to claim 1, wherein the one or more controllers are further configured to calculate digest information about the application package when the information processing apparatus is activated, and detect an alteration of the application package based on the calculated digest information and digest information corresponding to the application package stored in the storage.

9. An information processing method comprising:
    storing, in a storage, an application package including a plurality of scripts in the storage;
    loading a script to execute a function from the plurality of scripts included in the application package, the application package including the script which is to be loaded to execute the function and a script which is not to be loaded to execute the function;
    detecting an alteration of the script to be loaded based on digest information calculated from the script to be loaded and digest information corresponding to the scripts stored in the storage;
    executing the function using the loaded script, on condition that an alteration of the script to be loaded is not detected,
    wherein detecting an alteration of the script which is not to be loaded to execute the function included in the application package is not executed;
    when the script to execute the function included in the application package is loaded to a virtual machine, recording a fact that the script has been loaded; and
    before the script is loaded to the virtual machine, determining whether the script has been loaded based on the fact, and causing a detection of alteration of the loaded script not to be performed if the script is already loaded.

10. A non-transitory computer-readable storage medium storing a program for causing a computer to execute an information processing method in an information processing apparatus, the information processing method comprising:
    storing, in a storage, an application package including a plurality of scripts in the storage;
    loading a script to execute a function from the plurality of scripts included in the application package, the application package including the script which is to be loaded to execute the function and a script which is not to be loaded to execute the function;
    detecting an alteration of the script to be loaded based on digest information calculated from the script to be loaded and digest information corresponding to the scripts stored in the storage;
    executing the function using the loaded script, on condition that an alteration of the script to be loaded is not detected,
    wherein detecting an alteration of the script which is not to be loaded to execute the function included in the application package is not executed;
    when the script to execute the function included in the application package is loaded to a virtual machine, recording a fact that the script has been loaded; and
    before the script is loaded to the virtual machine, determining whether the script has been loaded based on the fact, and causing a detection of alteration of the loaded script not to be performed if the script is already loaded.

* * * * *